(12) United States Patent
Albert

(10) Patent No.: US 6,450,032 B1
(45) Date of Patent: Sep. 17, 2002

(54) VIBRATING BEAM FORCE SENSOR HAVING IMPROVED PRODUCIBILITY

(75) Inventor: William C. Albert, Lakewood, NJ (US)

(73) Assignee: Pressure Systems, Inc., Hampton, VA (US)

( * ) Notice: Subject to any disclaimer, the term of this patent is extended or adjusted under 35 U.S.C. 154(b) by 0 days.

(21) Appl. No.: 09/524,752

(22) Filed: Mar. 14, 2000

(51) Int. Cl.[7] .............................. G01P 15/10; G01L 1/10
(52) U.S. Cl. .................... 73/514.29; 73/704; 73/862.59
(58) Field of Search ..................... 73/704, 702, 862.59, 73/514.29; 310/321, 323.21

(56) References Cited

U.S. PATENT DOCUMENTS

| | | | |
|---|---|---|---|
| 3,470,400 A | 9/1969 | Weisborg | 310/15 |
| 4,215,570 A | 8/1980 | Eer Nisse | 73/862.59 |
| 4,406,966 A | 9/1983 | Paros | 73/702 |
| 4,479,391 A | * 10/1984 | Banik et al. | 73/862.59 |
| 4,939,935 A | * 7/1990 | Amand | 73/514.29 |
| 5,574,220 A | * 11/1996 | Amand et al. | 73/514.29 |
| 5,596,145 A | 1/1997 | Albert et al. | 73/514.29 |

OTHER PUBLICATIONS

Norman R. Serra, "Technical Report on the Quartz Resonator Digital Accelerometer," AGARD Conference Proceedings No. 43, May 1968, pp. 487–516.

* cited by examiner

*Primary Examiner*—John E. Chapman
(74) *Attorney, Agent, or Firm*—Nixon & Vanderhye P.C.

(57) ABSTRACT

A two-piece vibrating beam force sensor is created by utilizing one thickness of quartz for the outer mounting structure. This outer mounting structure in the case of a pressure sensor includes the mounting structure, the flexure beams and the lever arm and, in the case of an acceleration sensor, includes the mounting structure, the parallel flexure beams and the proof mass. An inner quartz structure made of a double-ended tuning fork vibrating beam assembly which provides an electrical output indicative of tension or compression applied to the beam assembly. The vibrating beam assembly is mounted on the outer quartz structure with epoxy resin or low melting temperature glass frit and suitable electrodes for stimulating the vibrating beams into vibration are provided. The resultant structure is an inexpensive, easily produced, yet highly accurate vibrating beam force sensor.

34 Claims, 5 Drawing Sheets

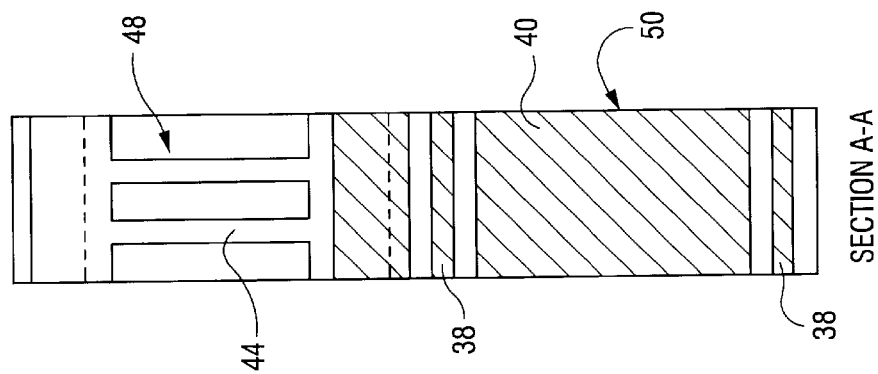
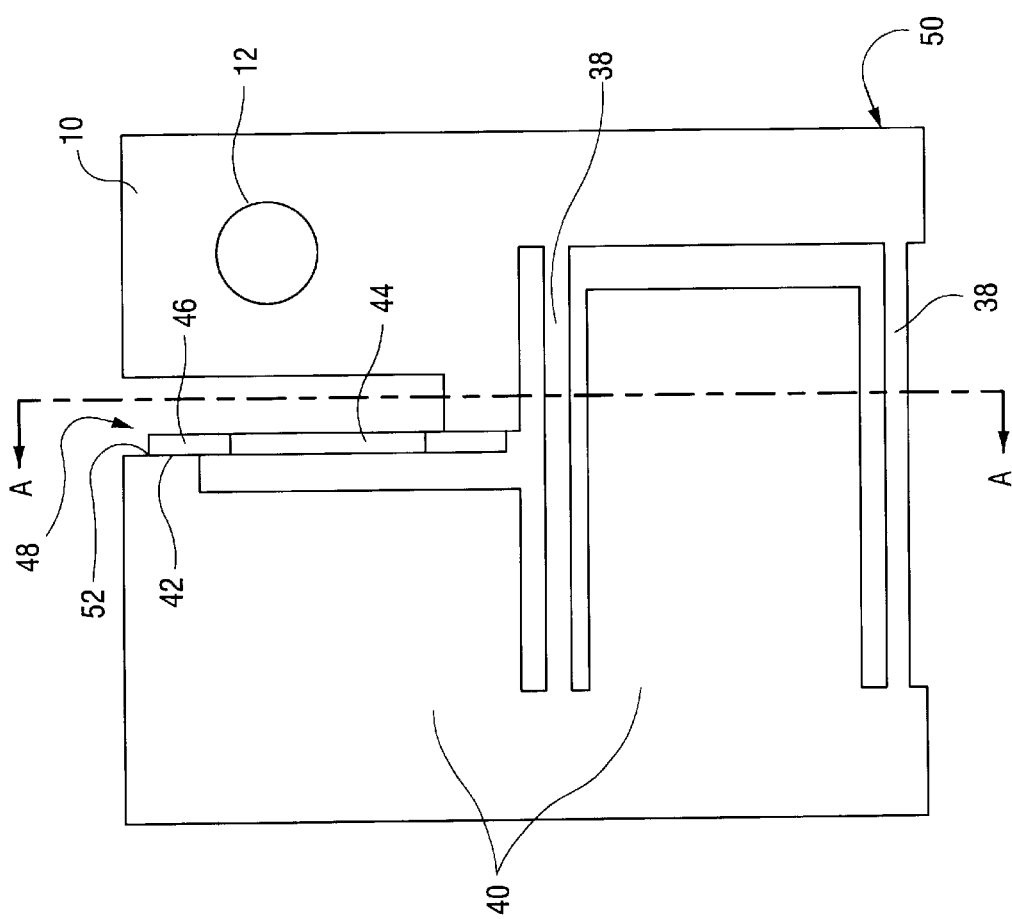
Fig. 4(a)
Fig. 4(b)
SECTION A-A

VIBRATING BEAM FORCE SENSOR HAVING IMPROVED PRODUCIBILITY

BACKGROUND OF THE INVENTION

1. Field of the Invention

The present invention relates to vibrating beam force sensors in general and to the construction of producible accurate vibrating beam force sensors in particular.

2. Description of the Prior Art

Vibrating beam force sensors (also known as resonant sensors) are well known in the art. A vibrating beam comprised of a quartz crystal is supplied with an electrical drive signal which causes the beam to resonate at a frequency dependent upon axial force applied to the beam. If the force is compressive, it decreases the vibrating frequency and, if the force is tensile, it increases the vibration frequency. The vibrating frequency can be sensed and provides an indication of the force applied. The force applied can be created by any structure, but of particular interest is a force derived from a bellows providing an indication of pressure or a force derived from a proof mass providing an indication of acceleration.

In U.S. Pat. No. 4,406,966 a structure is shown which mounts a vibrating quartz beam in the form of a double ended tuning fork (DETF) design so that forces on the supporting structure change the vibrational frequency of the tuning fork. Difficulties of such a system are that, because of the different coefficients of expansion of the different materials (the DETF being quartz and the supporting structure being metal), inaccuracies in measurement arise.

In U.S. Pat. No. 5,596,145 issued to Albert et al on Jan. 21, 1997, a monolithic resonator for a vibrating beam sensor is disclosed (the entire subject matter of the '145 Albert patent is herein incorporated by reference). The benefit of such a monolithic resonator is that the entire structure, including the vibrating beam and associated vibrational isolator mechanism, can all be machined out of a single quartz structure. Benefits and details of such a monolithic structure are provided in the '145 patent and are also disclosed in FIGS. 1(a) through 2(b) in the present application.

In FIG. 1 (a), a monolithic vibrating beam structure is disclosed having a mount structure 10 and a mounting hole 12 for securing the structure. In the prior art pressure sensor embodiment shown in FIGS. 1(a) through 1(c), two orthogonally arranged flexure beams 14 permit the lever arm portion 16 to pivot about pivot point 18 under the influence of bellows 20. Bellows 20 may be attached to any corresponding structure which transduces changes in fluid pressure into changes in mechanical force and applies that mechanical force to the end of lever arm 16.

In the event the pressure sensor is mounted as shown, it has been found helpful to provide a balance weight 22 which offsets the weight of the lever arm and the bellows. A vibrating beam 24 is located between the end of the lever arm portion 16 and the end of mount structure 10. It is connected to these structures respectively by isolator beams 26. In order to avoid transmitting vibrations to the lever arm and the mounting structure, isolator masses 28 are provided so as to avoid transmission of vibrating quartz beam root reactions through the isolator beams into the solid structure, thereby reducing the efficiency of resonant vibration or "Q."

End view FIG. 1(c) and cross-sectional view 1(b) illustrate the different thicknesses of quartz material used including the mounting structure having thickness indicated at 30, the isolator mass having thickness 32 and the vibrating beam with thickness 34. The single vibrating beam vibrates in the plane of FIG. 1(a), which also happens to be the plane in which flexing about pivot point 18 occurs. As discussed in U.S. Pat. No. 5,596,145, the above monolithic structure can be easily created. The multi-thickness integrated structure becomes practical due to the multiple thicknesses of the various portions of the structure. This allows for a very thin structure 34 for high vibrating beam sensitivity, a thicker structure 32 for desired vibration isolation mass and a substantially thicker structure 30 to provide strength of the overall design and its mount. The application of a suitable electrical drive voltage applied to electrodes 36 (whose pattern on the vibrating beam itself is not shown for clarity of illustration) causes the structure to operate.

FIG. 2(a) also illustrates the acceleration sensor of U.S. Pat. No. 5,596,145. Similar structures to those identified in FIGS. 1(a) through 1(c) are indicated with similar terms in FIGS. 2(a) and 2(b). However, unlike the pressure sensor whose flexure beams 14 are orthogonally oriented (so as to provide rotation about pivot point 18), the acceleration sensor flexure beams 38 are parallel and permit proof mass 40 to move in a direction orthogonal to the parallel flexure beams. With the mount structure rigidly mounted to a base whose acceleration is to be measured, movement of the base and consequently the mount structure 10 in the direction of arrows R will permit force to be applied to the vibrating beam where the force is proportional to the acceleration of the proof mass in an up or down direction (as shown in FIG. 2(a)). The structure of FIG. 2 would also be mounted in an evacuated and sealed housing (not shown).

As with the pressure sensor shown in FIGS. 1(a) through 1(c), the acceleration sensor shown in FIGS. 2(a) and 2(b) is a monolithic structure, in that the entire device is machined from a single piece of quartz crystal. The disadvantages of the prior art shown in FIGS. 1(a) through 2(c) are producibility and cost as a result of manufacturing limitations. The machining of the outer structure having the mounting structure thickness 30 is relatively economical, because tolerances are loose and "cookie cutter" methods of machining, such as ultrasonic machining, can be employed.

However, the inner structures comprising the isolator mass thickness 32, and more particularly the vibrating beam thickness 34, are much more difficult to machine. These features are not only delicate, but their tolerances must be kept relatively close. As a result, the more economical ultrasonic machining methods cannot be used and slower, more expensive methods are required. In addition, because even the thin inner structure features are still too thick, photo-etch processes such as those disclosed in U.S. Pat. No. 4,215,570 issued to EerNisse relating to the disclosed double-ended tuning fork (DETF) type vibrating beam assembly, cannot be used.

Thus, the methods used to easily and conveniently machine the thick outer structure compromises the ability to maintain the high degree of tolerance needed for proper machining of the vibrating beam structure thickness.

SUMMARY OF THE INVENTION

As a result of the above prior art difficulties, it is an object of the present invention to provide a construction for a force sensor in which an outer structure capable of being produced by conventional machining methods is combined with a second structure which is thin enough to be capable of machining by more accurate photo-etch processes.

It is an additional object of the present invention to provide an outer force carrying structure and a separate inner vibrating beam transducer structure in which each separate piece is machined in the most efficient manner.

It is a still further object of the present invention to provide a combination of outer structure and inner vibrating beam structures formed in the most economical manner and yet providing a high degree of accuracy.

The above and other objects are achieved by machining the outer structure in a conventional fashion for its thickness, i.e. ultrasonic machining, photo-etch machining or abrasive jet machining. The vibrating beam inner structure is created from a relatively thin quartz substrate with conventional "photo-etch" methods of machining. The need for intermediate thickness isolator beams is avoided by using a double-ended tuning fork design (DETF). In order to ensure equal force is applied to both of the vibrating beams of the DETF design, the plane of the vibrating beam assembly (and its plane of vibration) is oriented perpendicular to the plane of flexing of the outer structure.

BRIEF DESCRIPTION OF THE DRAWINGS

The present invention may be more clearly understood by reference to the following drawings wherein:

FIG. 4(a) is a side view of an acceleration sensor structure in accordance with the present invention;

FIG. 4(b) is a cross-sectional view of the acceleration sensor structure of FIG. 4(a) along section lines A—A;

DETAILED DESCRIPTION OF PREFERRED EMBODIMENTS

In the following discussion of preferred embodiments of the present invention, similar reference numbers will designate similar structures throughout the separate views.

Figure 3A:
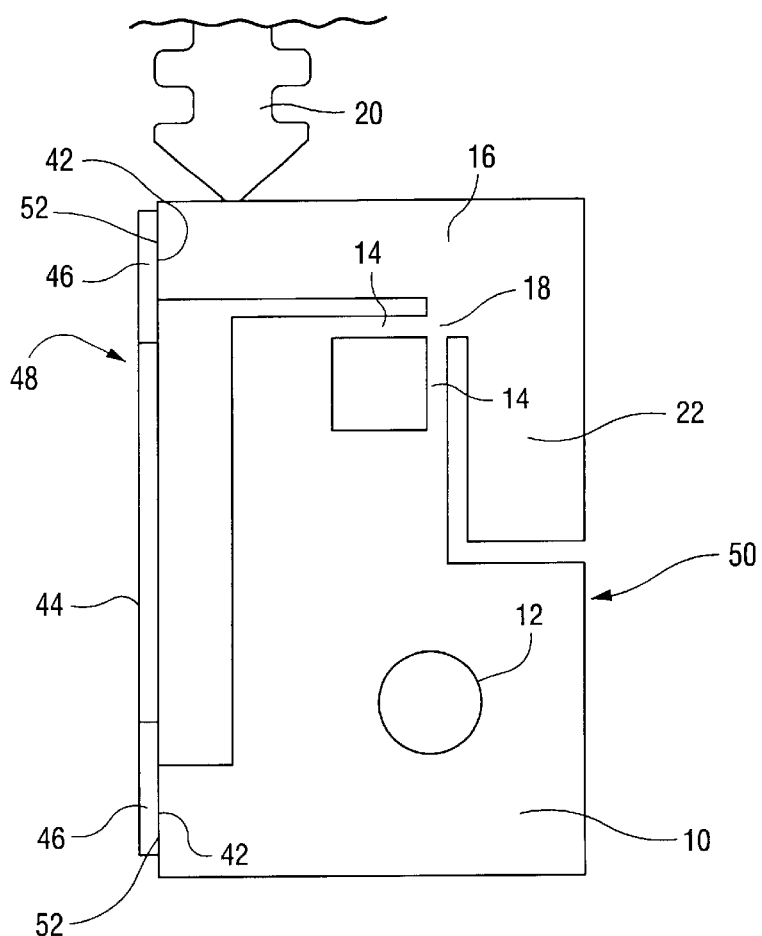
FIG. 3(a) is a side view of a pressure sensor structure in accordance with the present invention.

In FIG. 3(a), an integrated outer quartz mount structure 10 is provided with a mounting hole 12. As is known, orthogonal flexure beams 14 permit lever arm portion 16 and balance weight 22 to rotate about pivot point 18 under the influence of pressure to the bellows 20. However, at the end of lever arm 16 and the corresponding end of mount structure 10, the outer mount structure is provided with bonding pads 42. These bonding pads are located in what is essentially a first plane, where that first plane is orthogonal to the plane of the outer quartz mount structure 50. Movement of the lever arm portion 16 and balance weight 22 relative to the mount structure 10 occurs in both planes. Because the DETF is mounted in the first plane, each of its vibrating beams experiences the same force from the flexure beams since each beam is the same distance from the pivot point 18.

Figure 3B:
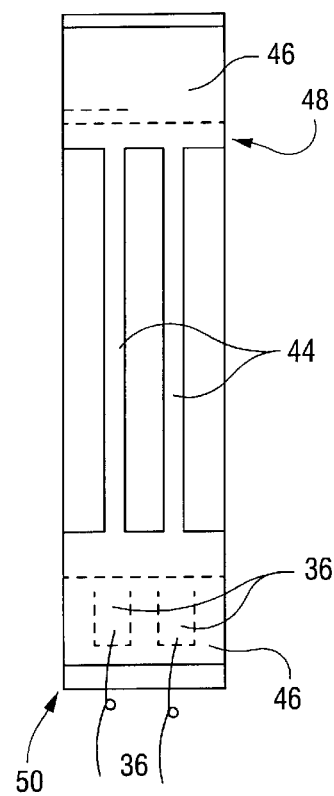
FIG. 3(b) is an end view of the pressure sensor structure in accordance with the present invention.

The details of applicant's double-ended tuning fork (DETF) are shown in FIG. 3(b), with the vibrating beams identified 44 and mounting ends 46. Electrodes 36 are applied to the vibrating beams in the conventional manner and sustain vibration (in association with an oscillator circuit, not shown) in the plane of the paper with respect to FIG. 3(b) and in and out of the plane of the paper with respect to FIG. 3(a). The quartz blank from which the inner quartz structure 48 (including vibrating beams 44 and mounting pads 46) is constructed can be very thin, thereby providing a high level of sensitivity to any applied force. The use of conventional photo-etch methods of construction results in inexpensive and highly repeatable construction of the vibrating beam structure with low levels of manufacturing defects.

The mounting pads of the inner quartz structure 48 are mounted on the bonding pads 42 of the outer quartz structure 50 by a bonding structure 52 which, in preferred embodiments, comprises an epoxy resin or a low melting temperature (about 420° C.) glass frit. Examples of such epoxies are Torr Seal from Varian, Palo Alto, Calif., EC 8121 from Emerson Cumming in Worburn, Mass. and/or Epo-Tek 353ND available from Epoxy Technology, Billerica, Mass. and an example of low temperature melting point glass frit is G-1013 available from Vitta Corp., Bethel, Conn.

As can be seen by the above discussion, the difficult-to-machine quartz inner structure in the prior art systems have been replaced by an economically manufacturable DETF which uses photo-etch techniques. The intermediate thickness structures, such as the isolator beams and isolator masses, are eliminated by using the DETF vibrating assembly. The substantially thicker outer quartz structure is machined with the conventional ultrasonic machining methods. Thus, while two joints have been introduced into the previously monolithic structure disclosed in U.S. Pat. No. 5,596,145, the use of an epoxy resin or a low melting temperature glass frit as a bonding agent renders such joints relatively trouble-free and only results in very slight, if any, performance degradation for most applications. Fortunately, the use of economic manufacturing techniques, coupled with the high reliability of such techniques, results in a force sensing system which is relatively inexpensive (compared to monolithic structures) and yet provides similar performance.

Figure 4C:
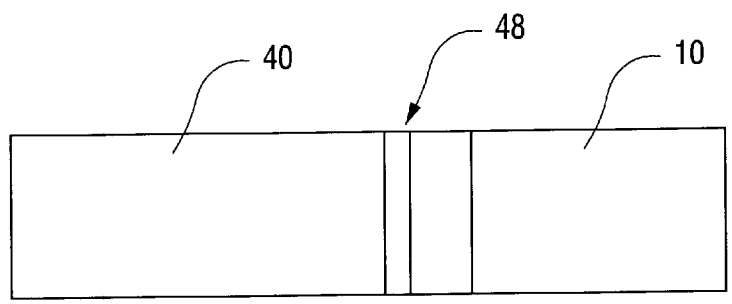
FIG. 4(c) is an end view of the acceleration sensor structure of FIG. 4(a)

FIG. 4(a) also discloses an acceleration sensor incorporating the invention of FIG. 3(a) through 3(c). The outer quartz structure 50 comprising the mount structure 10, the parallel flexure beams 38 and the proof mass 40, which are machined in a conventional manner, and in a preferred embodiment, by ultrasonic machining. The inner quartz structure 48 is machined using conventional photo-etch methods, since it is a much thinner quartz blank and, as in FIG. 3, has its mounting pads 46 bonded with a suitable bonding structure 52 to the bonding pads 42 of the outer quartz structure 50. Although not shown, the assembly of FIG. 4 could advantageously be located in a sealed and evacuated housing.

Figure 1A:
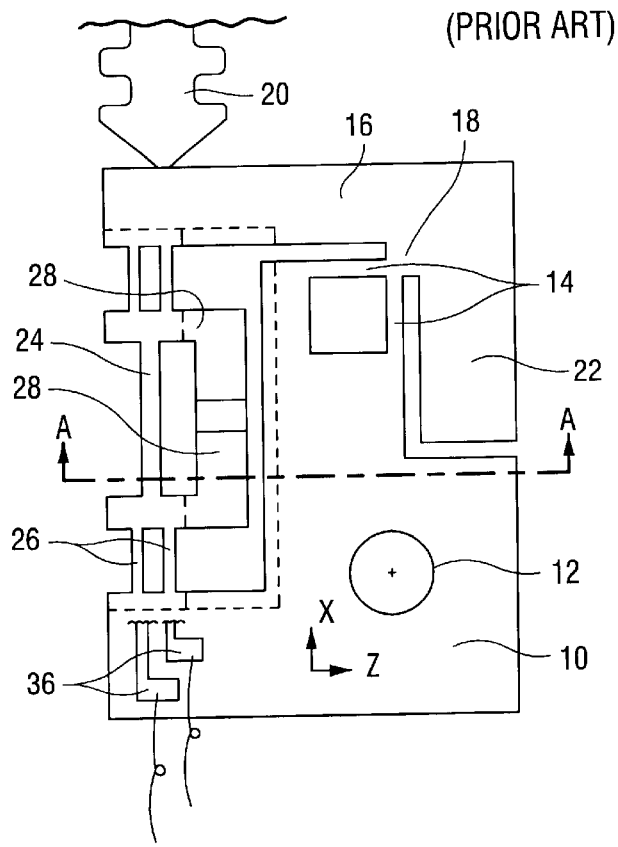
FIG. 1(a) is a side view of a conventional prior art pressure sensor structure.
Figure 1B:
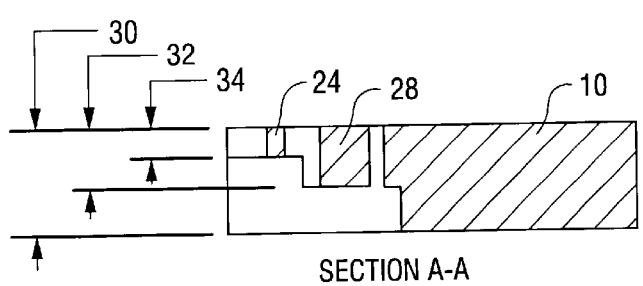
FIG. 1(b) is a cross-sectional view of the prior art pressure sensor structure in accordance with FIG. 1(a) at section lines A—A.
Figure 1C:
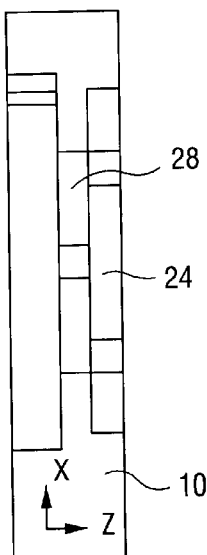
FIG. 1(c) is an end view of the prior art pressure sensor structure shown in FIG. 1(a)
Figure 2B:
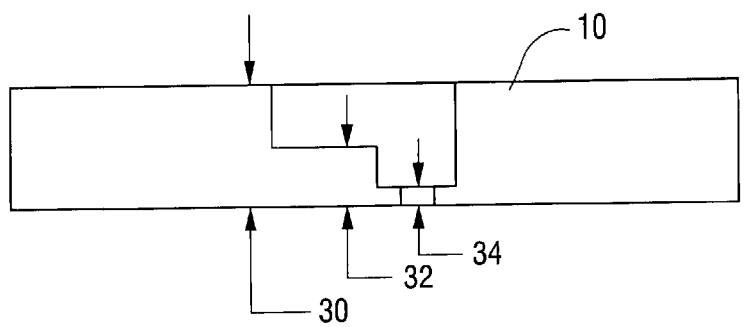
FIG. 2(b) is an end view of the prior art acceleration sensor structure shown in FIG. 2(a)
Figure 2A:
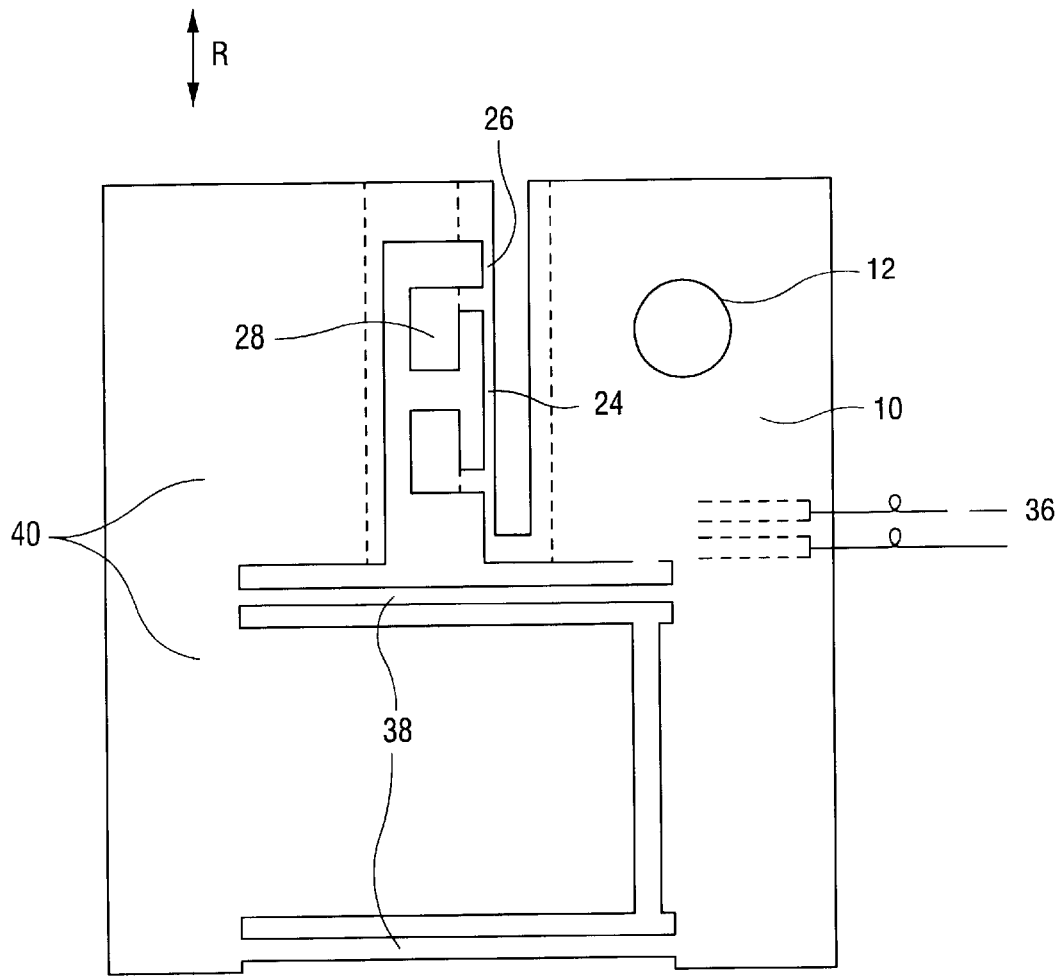
FIG. 2(a) is a side view of a conventional prior art acceleration sensor structure.

As in FIG. 3, the plane of vibration of the DTEF vibrating structure is orthogonal to the plane of movement of the proof mass relative to the mounting structure. Just as with the prior art acceleration sensor shown in FIG. 2(a), the parallel flexure beams permit the proof mass to move in a direction providing compression and tension forces onto the inner quartz structure 48. These acceleration induced forces change the resonant vibrating frequency of the vibrating beam assembly which is sensed providing the acceleration indicating output.

Figure 5A:
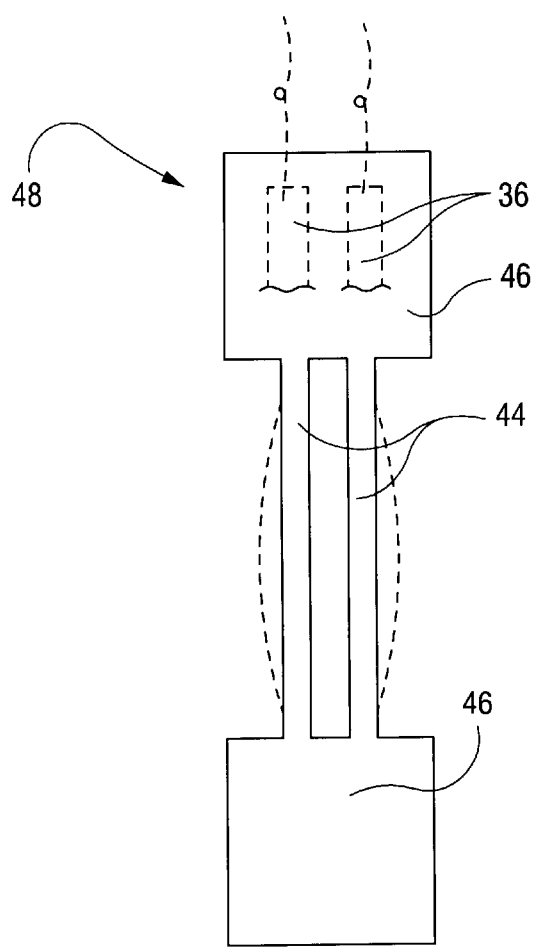
FIG. 5(a) is a plan view of a typical double ended tuning fork (DETF) vibrating beam as used in FIGS. 3(a) and 4(a)
Figure 5B:
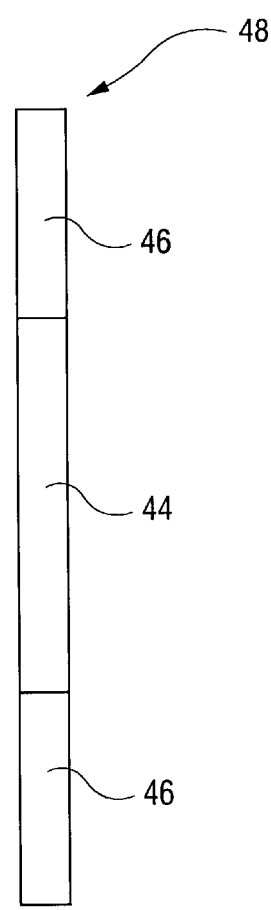
FIG. 5(b) is a side view of the vibrating beam illustrated in FIG. 5(a).

FIGS. 5(a) and 5(b) disclose front and side views of the inner quartz DETF structure 48 comprised of the mounting pads 46 and the vibrating beams 44. The electrodes 36 which are applied to the inner quartz assembly for stimulating the vibrating beam assembly into vibration are well known and shown in phantom line to avoid confusion. Because these beams are stimulated into vibration toward and away from each other (as shown by the dotted line drawing in FIG. 5(a)) beam root reactions cancel and therefore do not generate substantial inertial forces in the mounting pads and the resultant loss of energy into the outer quartz structure 50. Thus, the efficiency of operation or "Q" is relatively high. Additionally, the entire structure of FIGS. 3(a)–(c) and 4(a)–(c) (shown by dotted line housing 54 in FIG. 3) can be located in an evacuated container, thereby avoiding air resistance which would otherwise dampen the vibrations and reduce the "Q" or efficiency of operation.

In view of the above, many variations and modifications of the disclosed two-part force sensor will be readily apparent to those having ordinary skill in the art. While in a preferred embodiment, the outer structure is comprised of quartz having a thickness in the range of about 0.05 inches to about 0.15 inches with a preferred thickness of about 0.7 inches and the inner quartz structure has a thickness in the range of about 0.005 inches to about 0.015 inches with a preferred thickness of about 0.007 inches, different combinations of outer and inner quartz structure thicknesses will be obvious to those of ordinary skill in the art in view of the forces involved, the sensitivity needed and the frequencies desired in particular applications.

While specific epoxy resins and/or glass frits are disclosed, any material which suitably and rigidly bonds the mounting pad 46 to the bonding pad 42 will be sufficient for joining these two structures. Different methods of mounting the outer quartz structure 50 including its lever arms, balance weights and orthogonal flexure arms (in the case of the pressure sensor) and the proof mass and parallel flexure arms (in the case of the acceleration sensor) will be readily apparent to those of ordinary skill.

Accordingly, the present invention is limited only by the following claims appended hereto.

What is claimed is:

1. A quartz vibrating beam force sensor for providing an electrical output indicative of force applied to the sensor, said sensor comprising:
    an integrated outer quartz structure having a sufficient thickness so as to be compatible with said force applied to the outer structure, said outer structure including two bonding pads located substantially in a first plane and a flexure, said flexure comprising a weakness in said outer structure for relative movement of the two bonding pads in a second plane, said second plane orthogonal to said first plane, said relative movement of said bonding pads towards and away from each other is in relation to said force applied to the outer structure, wherein said outer structure flexure includes at least two flexure beams permitting one portion of said outer structure to move in said second plane with respect to another portion of said outer structure;
    an integrated inner quartz structure, said inner structure including a double ended tuning fork vibrating beam assembly having vibrating beams and mounting ends, said vibrating beam assembly having a primary mode of vibration in a plane parallel to said first plane;
    a structure bonding said inner structure mounting ends to said outer structure bonding pads; and
    electrodes for stimulating said vibrating beams into vibration and for monitoring the frequency of vibration wherein the frequency of vibration is related the direction and amount of force applied to the sensor.

2. The force sensor according to claim 1, wherein said outer quartz structure has a thickness measured in said first plane which is greater than a thickness of said vibrating beam assembly measured in said second plane.

3. The force sensor according to claim 2, wherein said outer structure thickness is within the range of about 0.05 to 0.15 inches and said vibrating beam assembly thickness is within the range of about 0.005 to 0.015 inches.

4. The force sensor according to claim 3, wherein said outer structure thickness is about 0.07 inches and said vibrating beam assembly thickness is about 0.007 inches.

5. The force sensor according to claim 1, wherein said outer structure includes a mount for fixing position of at least one portion of said outer structure.

6. The force sensor according to claim 1, wherein said bonding structure is an epoxy adhesive.

7. The force sensor according to claim 1, wherein said bonding structure is a glass frit having a melting temperature of less than quartz.

8. The force sensor according to claim 7, wherein said glass frit has a melting temperature of about 420° C.

9. The force sensor according to claim 1, further including a containment chamber in which said inner and outer structures are located.

10. The force sensor according to claim 9 wherein said containment chamber includes and maintains an evacuated atmosphere therein.

11. The force sensor according to claim 1, wherein said force sensor is a pressure sensor and said force is a pressure applied to one portion of said outer structure and another portion of said outer structure is fixed with respect to said force.

12. The pressure sensor of claim 11, wherein said flexure beams are orthogonal with respect to each other and permit flexure of said one portion with respect to said other portion about a pivot point.

13. The pressure sensor of claim 12, wherein said one portion includes a lever arm with one of said bonding pads on an end thereof, and said other portion includes a mounting hole and the other of said bonding pads thereon.

14. The pressure sensor of claim 13, wherein said lever arm has mass extending on one side of said pivot point, said one portion further includes a balance weight extending on an opposite side of said pivot point, thereby at least partially balancing the weight of said lever arm.

15. The pressure sensor of claim 11, wherein said pressure applied to said one portion of said outer structure comprises a bellows, said bellows having a portion fixed with respect to said other portion of said outer structure, and a moveable portion, where movement of said moveable portion of said bellows is dependent upon fluid pressure in said bellows.

16. The pressure sensor according to claim 11, wherein said outer quartz structure has a thickness measured in said first plane which is greater than a thickness of said vibrating beam assembly measured in said second plane.

17. The pressure sensor according to claim 11, wherein said outer structure includes a mount for fixing position of at least one portion of said outer structure.

18. The pressure sensor according to claim 11, wherein said outer structure thickness is within the range of about 0.05 to 0.15 inches and said vibrating beam assembly thickness is within the range of about 0.005 to 0.015 inches.

19. The pressure sensor according to claim 18, wherein said outer structure thickness is about 0.07 inches and said vibrating beam assembly thickness is about 0.007 inches.

20. The pressure sensor according to claim 11, wherein said bonding structure is a glass frit having a melting temperature less than the melting temperature of quartz.

21. The pressure sensor according to claim 11, further including a containment chamber in which said inner and outer structures are located.

22. The pressure sensor according to claim 21, wherein said containment chamber includes and maintains an evacuated atmosphere therein.

23. The force sensor according to claim 1, wherein said force sensor is an acceleration sensor and said force is a force due to acceleration of a proof mass applied to one portion of said outer structure and another portion of said outer structure is fixed with respect to said acceleration.

24. The acceleration sensor of claim 23, wherein said outer structure flexure includes two flexure beams permitting one portion of said outer structure to move in said second plane with respect to another portion of said outer structure.

25. The acceleration sensor of claim 24, wherein said flexure beams are parallel with respect to each other and permit flexure of said one portion with respect to said other portion in a direction orthogonal with respect to said flexure beams.

26. The acceleration sensor of claim 25, wherein said one portion includes a proof mass with one of said bonding pads on an end thereof, and said other portion includes a mounting hole and the other of said bonding pads thereon.

27. The acceleration sensor of claim 26, wherein acceleration of said sensor portion having said mounting hole flexes said flexure beams under the force attempting to accelerate said proof mass in said direction orthogonal to said flexure beams and thereby applying one of a positive and negative force on said vibrating beam assembly bonded between said bonding pads.

28. The acceleration sensor according to claim 23, wherein said outer quartz structure has a thickness measured in said first plane which is greater than a thickness of said vibrating beam assembly measured in said second plane.

29. The acceleration sensor according to claim 23, wherein said outer structure includes a mount for fixing position of at least one portion of said outer structure.

30. The acceleration sensor according to claim 23, wherein said outer structure thickness is within the range of about 0.05 to 0.15 inches and said vibrating beam assembly thickness is within the range of about 0.005 to 0.015 inches.

31. The acceleration sensor according to claim 30, wherein said outer structure thickness is about 0.07 inches and said vibrating beam assembly thickness is about 0.007 inches.

32. The acceleration sensor according to claim 23, wherein said bonding structure is a glass frit having a melting temperature less than the melting temperature of quartz.

33. The acceleration sensor according to claim 23, further including a containment chamber in which said inner and outer structures are located.

34. The acceleration sensor according to claim 33, wherein said containment chamber includes and maintains an evacuated atmosphere therein.

* * * * *